Feb. 16, 1932.   J. W. DUKE   1,845,251
AIRPLANE
Filed Feb. 12, 1931

INVENTOR,
John W. Duke,
BY J. Stuart Freeman
ATTORNEY.

Patented Feb. 16, 1932

1,845,251

UNITED STATES PATENT OFFICE

JOHN W. DUKE, OF PHILADELPHIA, PENNSYLVANIA, ASSIGNOR TO JOHN F. DUKE, OF PHILADELPHIA, PENNSYLVANIA

AIRPLANE

Application filed February 12, 1931. Serial No. 515,157.

The object of the invention is to provide improvements in heavier-than-air craft, and in the following description and claims the term airplane is employed to designate the broad classification referred to, including all forms of hollow wing gliders such as those of the primitive type.

As gas-inflated craft must necessarily be of relatively very large size in order to lift a given load, their use is limited and under even the most favorable conditions their speed is much slower than is desirable, while their cost of production is extremely high. Consequently, airplanes have experienced a much more rapid development and increase in production and use, though it has at all times been realized that it would be greatly to their credit if they were more buoyant at slower speeds as well as being buoyant at high speeds, in order both to decrease their tendency to fall and to permit them to alight within the limits of relatively small areas.

Another object of the invention has therefore been to provide means for increasing the buoyancy and resultingly the lifting ability of a given airplane, without in any way retarding its normal speed, but permitting it instead to remain aloft at somewhat less speed than is necessary to maintain a given altitude in the absence of the present improvements.

A further and more specific object is to embody within the wings of an airplane the equivalent of cells which are adapted to have their initial air content displaced by a lifting gas such as hydrogen or helium, whether such cells are separate from the primary wing structure or are an integral part thereof.

A still further object is to provide a construction in which the usual fabric defining the exterior surfaces of the wings also comprises the walls of the one or more gas-containing compartments, and for carrying out this purpose channelled means are provided for conducting through the one or more wings the wires or cables for actuating the usual ailerons and for other purposes, together with a construction which prevents the escape of gas from said one or more compartments.

Figure 1:
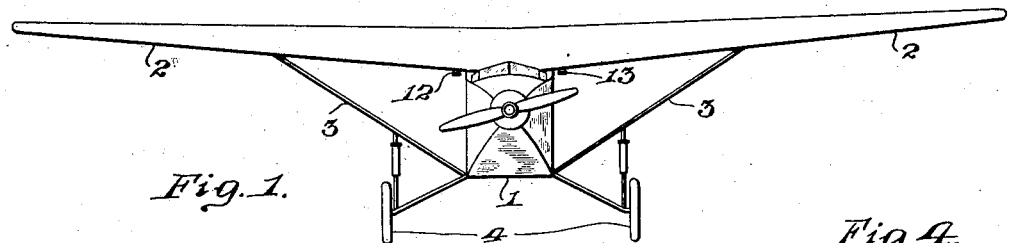
Figure 4:
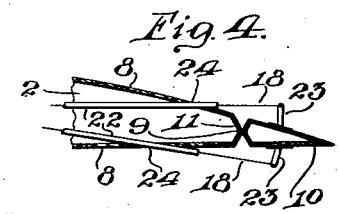
Figure 2:
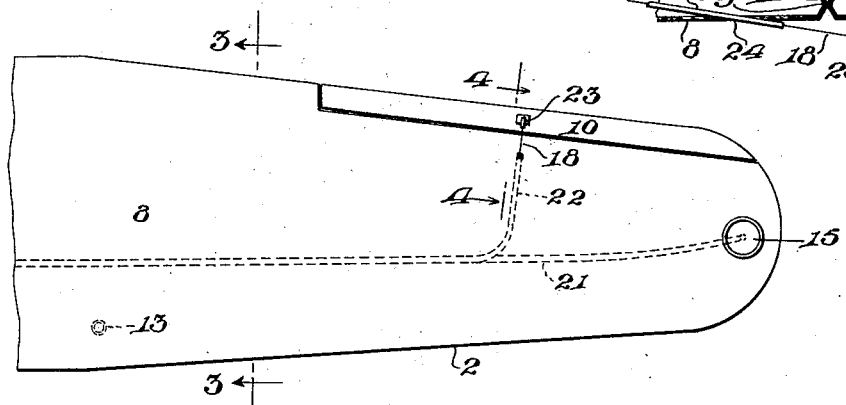
Figure 6:
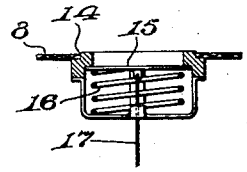
Figure 3:
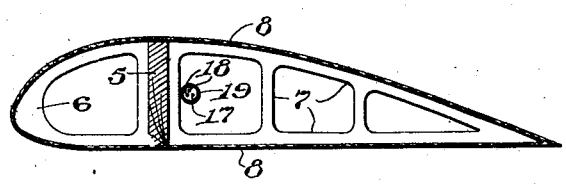
Figure 5:

With these and other objects in mind, the present invention comprises further details of construction and operation, which are fully brought out in the following description when read in conjunction with the accompanying drawings, in which Fig. 1 is a front elevation of an airplane comprising one embodiment of the invention; Fig. 2 is an enlarged fragmentary portion of one of the wings in plan; Fig. 3 is a vertical section on the line 3—3 of Fig. 2; Fig. 4 is an enlarged section on the line 4—4 of Fig. 2; Fig. 5 is an elevational view of a fragmentary portion of the wire or cable-carrying tubes; and Fig. 6 is an enlarged transverse section of the escape valve.

Referring to the drawings, any conventional type of airplane is shown as comprising a fuselage 1, across the top and extending in laterally opposite directions from which are integrally connected wings 2, or a single wing construction, as may be desired, said wings and fuselage being furthermore connected by struts or guys 3, and the device as a whole supported by suitably mounted landing gear 4, which is here illustrated as comprising a pair of wheels, but which may instead comprise skids, pontoons, or other elements suitable for the function which they are intended to perform.

Each wing comprises construction details conforming to accepted practice, in this instance being shown (purely for illustrative purposes) as comprising a longitudinal member 5, to which are secured the usual forward and rear frame elements 6 and 7, respectively, there being as many such elements as are desirable and all being covered by suitable rubberized or other fabric 8, which primarily is proof against the passage of all types of fluids, that is, not only water-tight, but gas-tight as well. The unit wing as shown in Fig. 1, or unitarily connected wings, as the case may be, have their fabric covering so formed as to fully inclose one or more gas cells, at the point 9 of pivotal attachment of the aileron 10 to an adjacent wing, the fabric upon the top and bottom surfaces of the wing being brought together as at 11 to prevent the escape of gas in that locality.

Assuming that he airplane shown in Fig. 1 has a single wing which extends in opposite directions from the fuselage and therefore contains but a single gas cell, valves 12 and 13 are spaced at convenient locations at or adjacent to the lowermost portion of such cell, the former valve being for the admission of lifting gas, such as hydrogen or helium, and the other valve being for the exit of the air which is originally in said wing cell and which the gas displaces. One or more of the normally highest points of the fabric inclosing each cell is provided with an aperture 14 in which is secured any well-known form of diaphragm valve 15, the diaphragm of such valve being retained in normal closed position by means of a suitable spring 16, against the tension of which a wire or cable 17 is adapted to pull for the purpose of opening said diaphragm and permitting the escape of a lifting gas within the adjacent gas cell.

For the puropse of conducting the valve-releasing wire or cable 17 and the aileron-actuating wires or cables 18 to their respective termini from the cockpit within said fuselage, a gas-tight tubular conduit 19 extends substantially throughout the length of each wing structure and through this tube extends said wires or cables. It will be noted, however, that said tube at the point 20 (see Fig. 5) divides and merges into an axially continuous tubular branch 21, through which extends the wire 17 to said diaphragm valve, and two angularly directed diverging tubular branches 22 through which extend the wires 18 from the course towards the offset brackets 23 carried by the adjacent aileron. It is to be understood that at those points 24 where the diverging wings 22 pass through the fabric 8, joints are provided which are thoroughly gas-tight, a similar condition existing at the opposite end of the tube 19 where it extends from within the gas cell of a wing and thence into the cockpit.

In the operation of this device it will be readily understood that an airplane equipped with this invention is adapted to operate in the usual manner with air filling the spaces within its one or more wing structures. However, when it is desired to provide such airplane for carrying somewhat heavier loads than with air filled wings, or for decreasing the landing speed of such airplane, and for other desirable purposes, suitable lifting gas is forced into the valve 12 while the air which it displaces finds its way outwardly through the exit valve 13, being heavier than such lifting gas. These inlet and exit valves may be of any desired construction, but primarily comprise a relative lightly positioned diaphragm, past which lifting gas can be forced in the one case and past which air can escape in the other, the function of the diaphragm of each valve normally being to merely close its adjacent valve against the accidental escape of lifting gas within the wing cells or cells. The diaphragm valve 15 by pulling upon the wire 17 may then be used whenever desired for permitting the lifting gas to escape rapidly from within the particular cell or cells, the escape valves of which are thus actuated, in such case air by virtue of its greater weight readily rushing inwardly through the inlet valve 12 to take the place of the lifting gas as fast as the latter leaves such escape valve.

In order that the flier within and operating the airplane can detect a leakage or a diminution of the gas content of the wing cells, there may be provided within the cockpit and visible to the flier a relatively delicate instrument of suitable design to directly indicate when and to what extent an appreciable amount of the lifting gas has escaped and has been replaced by an equal volume of air. The operation of such instrument depends upon the difference in the densities of the gas and air, and upon its showing that any substantial amount of the gas has been replaced by air, the one or more cells of the wing or wings may be refilled with gas as hereinbefore described.

Having thus described my invention, what I claim and desire to protect by Letters Patent of the United States is:—

1. An airplane, comprising wings, air-tight covering for said wings, ailerons carried by said wings, wires for controlling the positions of said ailerons extending through said wings, and channelled means for conducting said wires through said wings without permitting gas to escape from within said wings.

2. An airplane, comprising wings, a covering for said wings to inclose therein one or more air-tight compartments, ailerons carried by said wings, wires for controlling the positions of said ailerons extending through said wings, valves to permit the admission of gas into and the escape of air from within said wings, and channelled means in air-tight connection with said covering for conducting said wires through said wings without permitting the escape of gas therefrom.

3. An airplane, comprising wings, a covering for said wings to inclose therein one or more air-tight compartments, ailerons carried by said wings, wires for controlling the positions of said ailerons extending through said wings, valves to permit the admission of gas into and the escape of air from within said wings, an emergency valve for permitting the rapid escape of gas from within said wings, an actuating wire for releasing said last-named valve, and channelled means in air-tight connection with said covering for conducting said wires through said wings without permitting the accidental escape of gas therefrom.

In testimony whereof I have affixed my signature.

JOHN W. DUKE.